US008423854B2

(12) United States Patent
Dinan et al.

(10) Patent No.: US 8,423,854 B2
(45) Date of Patent: Apr. 16, 2013

(54) COMMUNICATION RETRANSMISSION BASED ON TRANSMISSION PERFORMANCE RELATIVE TO EXPECTED QUALITY OF SERVICE

(75) Inventors: Esmail Hejazi Dinan, Herndon, VA (US); Mohammad Ghaus, Ashburn, VA (US); PinalKumari K. Tailor, Ashburn, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 869 days.

(21) Appl. No.: 12/396,166

(22) Filed: Mar. 2, 2009

(65) Prior Publication Data

US 2010/0223523 A1 Sep. 2, 2010

(51) Int. Cl.
*G08C 25/02* (2006.01)
(52) U.S. Cl.
USPC .......................................................... 714/748
(58) Field of Classification Search .................. 714/748, 714/749, 750, 751
See application file for complete search history.

(56) References Cited

U.S. PATENT DOCUMENTS

| | | | | |
|---|---|---|---|---|
| 6,134,694 A * | 10/2000 | Uebayashi et al. | ............ | 714/751 |
| 7,127,654 B2 * | 10/2006 | Jalali et al. | .................... | 714/748 |
| 7,185,256 B2 * | 2/2007 | Miki et al. | ..................... | 714/751 |
| 7,350,125 B2 * | 3/2008 | Jang et al. | ...................... | 714/748 |
| 7,444,578 B2 * | 10/2008 | Meyer et al. | ................... | 714/748 |
| 7,584,397 B2 * | 9/2009 | Terry | ............................. | 714/748 |
| 7,616,658 B2 * | 11/2009 | Harada et al. | ................. | 370/465 |
| 7,689,892 B2 * | 3/2010 | Stolpman et al. | ............. | 714/774 |
| 7,747,921 B2 * | 6/2010 | DaCosta | ....................... | 714/748 |
| 8,074,137 B2 * | 12/2011 | Terry et al. | ..................... | 714/748 |
| 8,074,138 B2 * | 12/2011 | Chae et al. | ..................... | 714/748 |
| 2003/0177436 A1 * | 9/2003 | Gruhn et al. | ................... | 714/776 |
| 2006/0120323 A1 | 6/2006 | Ye et al. | | |
| 2007/0104131 A1 | 5/2007 | Puthenkulam et al. | | |
| 2008/0005639 A1 * | 1/2008 | Frederiksen | ................... | 714/751 |
| 2008/0130670 A1 | 6/2008 | Kim et al. | | |
| 2009/0138775 A1 * | 5/2009 | Christiaens et al. | .......... | 714/748 |
| 2009/0310493 A1 * | 12/2009 | Nogami | ....................... | 370/252 |
| 2010/0080176 A1 * | 4/2010 | Maas et al. | ..................... | 370/329 |

* cited by examiner

*Primary Examiner* — Joshua Lohn
(74) *Attorney, Agent, or Firm* — O'Brien Jones, PLLC

(57) ABSTRACT

A method of communication retransmission based on performance relative to an expected quality of service is presented. In the method, data packets associated with the expected quality of service are transmitted. The transmission performance associated with the transmission of the data packets is determined in relation to the expected quality of service. A maximum number of retransmissions for one of the data packets to be transmitted is selected based on the transmission performance. The one of the data packets is transmitted using the communication retransmission scheme limited by the selected maximum number of retransmissions.

18 Claims, 6 Drawing Sheets

| MCS MODE | MIMO MODE | BITS/SYMBOL | MCS INDEX |
|---|---|---|---|
| QPSK 1/8 | STC | 0.25 | 1 |
| QPSK 1/4 | STC | 0.5 | 2 |
| QPSK 1/2 | STC | 1 | 3 |
| QPSK 3/4 | STC | 1.5 | 4 |
| 16QAM 1/2 | STC | 2 | 5 |
| 16QAM 3/4 | STC | 3 | 6 |
| 64QAM 1/2 | STC | 3 | 7 |
| 64QAM 2/3 | STC | 4 | 8 |
| 64QAM 3/4 | STC | 4.5 | 9 |
| 64QAM 5/6 | STC | 5 | 10 |
| 64QAM 1/2 | SM | 6 | 11 |
| 64QAM 2/3 | SM | 8 | 12 |
| 64QAM 3/4 | SM | 9 | 13 |
| 64QAM 5/6 | SM | 10 | 14 |

FIG. 6

COMMUNICATION RETRANSMISSION BASED ON TRANSMISSION PERFORMANCE RELATIVE TO EXPECTED QUALITY OF SERVICE

TECHNICAL BACKGROUND

Most communication systems incorporate one or more methods of error recovery to render the communications carried by the system more robust or resilient. Two such methods are data error detection and/or correction, and data retransmission. In error detection, a relatively small amount of redundant data is added to a data transmission, such as a data packet, before being transmitted. At the receiving end of the transmission, the redundant data is compared to the original data in the data packet to determine whether the data packet includes any data errors. In error correction, such as forward error correction (FEC), a relatively large amount of redundant data complements the original data, such that some data errors of the primary data may be corrected on the receiving end using the redundant data. Generally, significantly more redundant data is required to correct errors in the original data than what is required to merely detect the errors, thus imposing a tradeoff between communication overhead and error correction capability.

Retransmission mechanisms, on the other hand, typically rely on feedback from a receiver of a communication transmission. More specifically, if the receiver receives a data packet without uncorrectable errors, the receiver may "acknowledge" receipt of the data to the transmitter of the data. Oppositely, when the receiver does not acknowledge such receipt, indicating that the transmitted data was erroneous and unrecoverable, the transmitter may then retransmit the data packet to the receiver, thus trading data throughput for data integrity.

While each of the two error recovery methods above are powerful, a combination thereof may often provide a robust transmission scheme while facilitating a reasonable level of communication overhead or throughput. For example, the hybrid automatic repeat request (HARQ) retransmission mechanism causes a first transmission of a data packet from a transmitter to a receiver to include error detection data without error correction data, thus maintaining a low level of communication overhead. If the receiver positively acknowledges error-free receipt of the data packet, the transmitter may then transfer another data packet in a similar manner. If, instead, the receivers does not acknowledge receipt, or negatively acknowledges the data packet, the transmitter may then retransmit the data packet, this time with error correction data. As a result, error correction data and its associated overhead are included in the data packet only after the transmitter receives an unrecoverable data packet, thus providing a significant reduction in overhead over schemes in which error correction data accompanies every data packet.

In many communication systems, the transmitted data packets may be associated with a particular "quality of service", by which a stream of such packets, often termed a "service flow", are expected to adhere to particular performance levels, such as maximum levels of delay, jitter, and packet loss. As a result, error recovery techniques, such as error detection/correction and data retransmission, may positively or negatively affect the ability of the communication system to meet an expected quality of service.

Overview

Discussed herein is a method of communication retransmission. In the method, data packets associated with an expected quality of service are transmitted. Transmission performance associated with the transmission of the data packets is determined in relation to the expected quality of service. A maximum number of retransmissions for one of the data packets to be transmitted is selected based on the transmission performance. The one of the data packets is transmitted using the communication retransmission scheme limited by the selected maximum number of retransmissions. In another implementation, a computer-readable medium has encoded thereon instructions executable by a processor for implementing the above method of communication retransmission.

Further presented herein is a communication station configured to employ a retransmission scheme. The communication station includes transmission circuitry and a transmission scheduler. The transmission circuitry is configured to transmit data packets associated with an expected quality of service to a communication device. The transmission scheduler is configured to transfer the data packets to the transmission circuitry according to the expected quality of service. The scheduler is also configured to determine transmission performance of the data packets relative to the expected quality of service, and to select a maximum number of retransmissions for one of the data packets to be transmitted based on the transmission performance. Further, the transmission circuitry is configured to transmit the one of the data packets using a communication retransmission scheme limited by the selected maximum number of retransmissions.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 6 is a table relating various transmission operating modes to a modulation and coding scheme index according to an embodiment of the invention.

DETAILED DESCRIPTION

The following description and associated figures depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
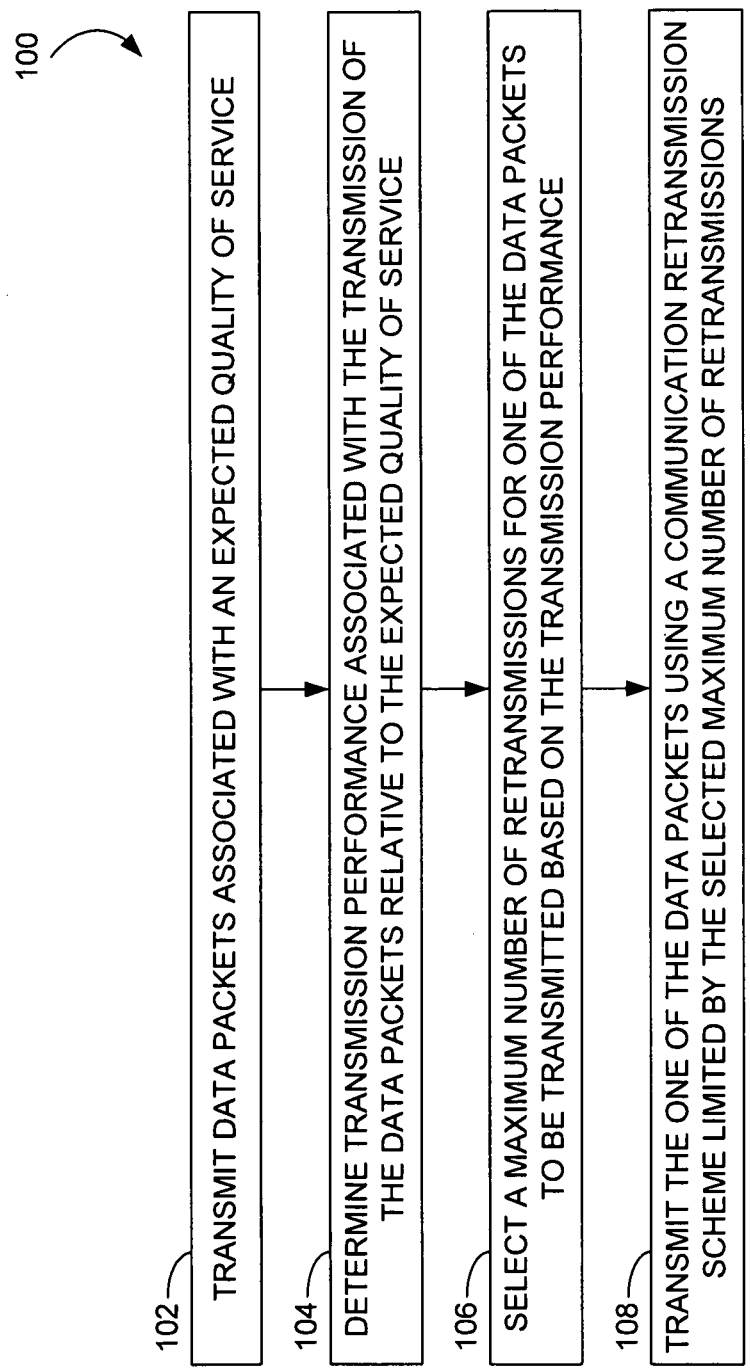
FIG. 1 is a flow diagram illustrating a method according to an embodiment of the invention for communication retransmission.

FIG. 1 presents a flow diagram of a method 100 according to an embodiment of the invention for communication retransmission, such as that performed when an initial transmission of data is unsuccessful. In the method 100, data packets associated with an expected quality of service are transmitted (operation 102). Transmission performance associated with the transmission of the data packets, relative to the expected quality of service, is determined (operation 104). A maximum number of retransmissions for one of the data packets to be transmitted is selected based on the transmission performance (operation 106). The one of the data packets is transmitted using a communication retransmission scheme limited by the selected maximum number of retransmissions (operation 108). While the operations 102-108 of FIG. 1 are presented in a specific order, other possible orders of execution, including concurrent execution of two or more of the operations, are possible in other implementations. In another embodiment, a computer-readable medium may have encoded thereon instructions executable by one or more processors for employing the method 100 of FIG. 1.

Figure 2:
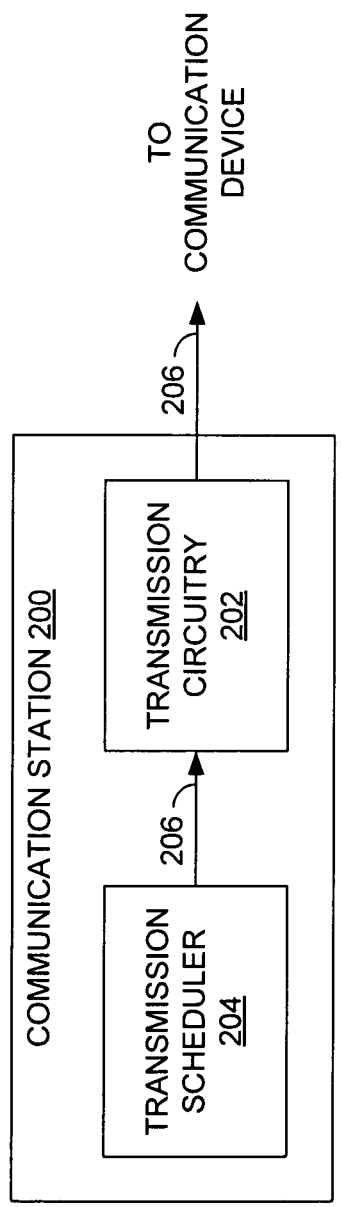
FIG. 2 is a block diagram of a communication station configured to employ a retransmission scheme according to an embodiment of the invention.

FIG. 2 provides a block diagram of a communication station 200 configured to employ a communication retransmission scheme according to an embodiment of the invention. The communication station 200 includes transmission circuitry 202 and a transmission scheduler 204. The transmission circuitry 202 is configured to transmit data packets 206 associated with an expected quality of service to a communication device (not shown in FIG. 2). The transmission scheduler 204 is configured to transfer the data packets 206 to the transmission circuitry 202 according to the expected quality of service. The scheduler 204 is also configured to determine transmission performance of the data packets 206 relative to the expected quality of service, and to select a maximum number of retransmissions for one of the data packets 206 to be transmitted based on the transmission performance. The transmission circuitry 202 is configured to transmit the one of the data packets 206 using a communication retransmission scheme limited by the selected maximum number of retransmissions.

Figure 3:
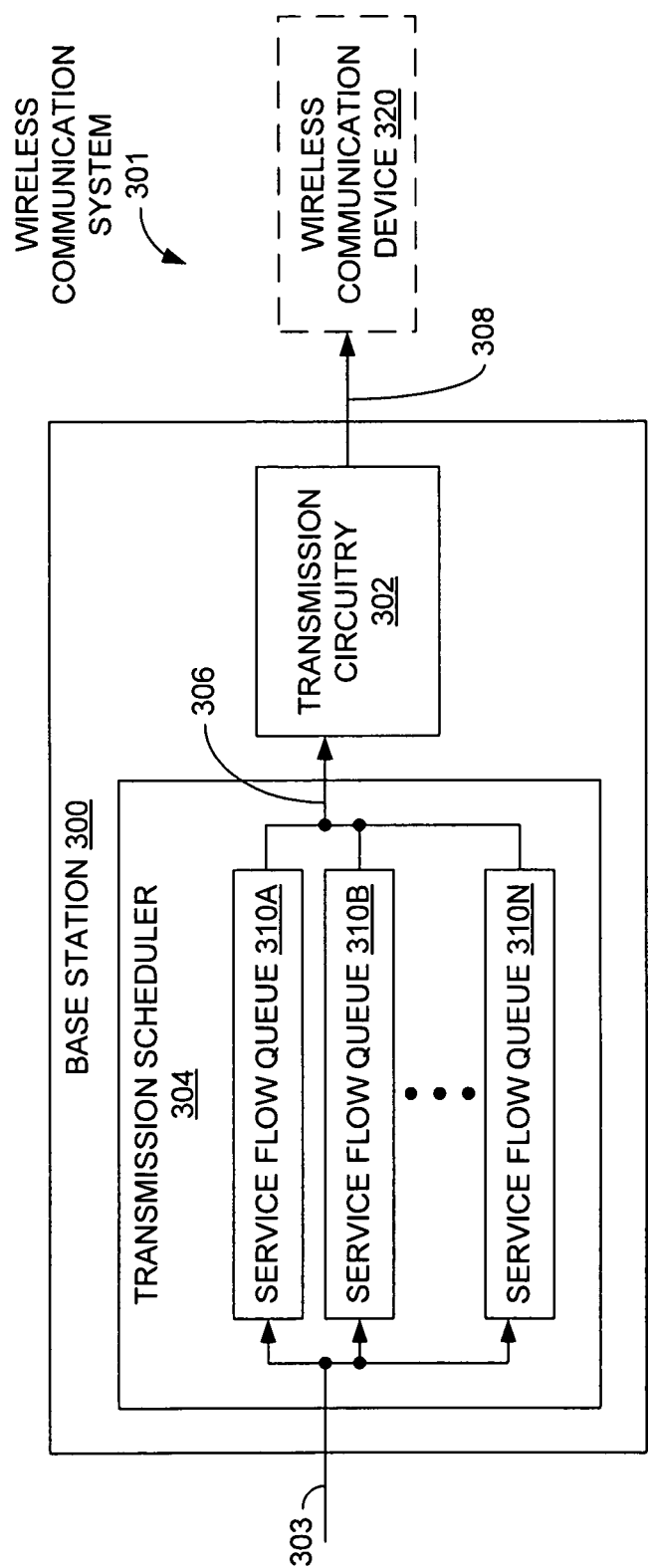
FIG. 3 is a block diagram of a wireless communication system employing a base station configured to employ a retransmission scheme according to another embodiment of the invention.

FIG. 3 depicts a wireless communication system 301 employing a communication base station 300 configured to communicate with at least one wireless communication device 320, such as a cell phone, personal digital assistant (PDA), or other wireless or mobile communication device. In the specific implementation of FIG. 3, the base station 300 is a base station (BS) for the Worldwide Interoperability for Microwave Access (WiMAX) technology based upon the Institute for Electrical and Electronics Engineers (IEEE) 802.16 standard. However, other communication stations or devices adapted to engage in wired or wireless communication with another device may be configured as described hereinafter.

The base station 300 of FIG. 3 includes transmission circuitry 302 and a transmission scheduler 304 for transmitting data packets 308 to the communication device 320. More specifically, the transmission scheduler 304 receives incoming data packets 303 from a backhaul communication network (not shown in FIG. 3). Each of the incoming data packets 303 is associated with a particular data flow, "service flow", or stream of data packets identified with a particular application or device. Further, each service flow is associated with a particular quality of service (QoS), which determines the level of service or priority the communication system 301 assigns to the corresponding service flow. Essentially, the higher the quality of service for a particular service flow, the higher the priority that is assigned to the data packets of the service flow when transmitting those packets to their intended destination. For example, service flows associated with more time-critical applications, such as video data streams, or those flows involving customers paying a higher service fee, may warrant a particular quality of service focusing on reduced transmission delay.

A quality of service for a service flow may be measured or described by way of a number of performance measurements. In WiMAX, for example, a quality of service may be described by the total delay of a data packet 303 from the time it is received at the base station 300 until the corresponding data packet 308 is transmitted from the base station 300 to the wireless communication device 320. Another metric defining a quality of service may be the total "jitter", or variation in the total delay, of a data packet 303 through the base station 300. Yet another may be the total packet loss, defined as a ratio or percentage of the total number of packets, transferred through the base station 300. While the base station 300 discussed herein utilizes total delay, total jitter, and total data packet loss, other metrics may be utilized to define a quality of service in other implementations.

The transmission circuitry 302 of FIG. 3 includes circuitry required to transmit data packets 308 over an air interface to the wireless communication device 320. As described in greater detail below, the transmission circuitry 302 may incorporate error detection and/or correction data with the original data from the received data packets 303 to yield the transmitted data packets 308. Also as described more fully below, the transmission circuitry 302 possesses the capability to retransmit those data packets 308 which the receiving communication device 320 indicates are uncorrectable. The transmission circuitry 302 may also incorporate other circuitry necessary for the actual transmission and retransmission of the data packets 308, such as one or more signal amplifiers, antennas, and the like.

Each of the transmission scheduler 304 and the transmission circuitry 302 may be operated or controlled by way of separate or unified control logic (not shown in FIG. 3) to perform or control the various operations discussed below. Such control logic may include one or more processors, such as microprocessors, microcontrollers, or digital signal processors (DSPs), capable of performing the various control tasks described hereafter for either or both of the scheduler 304 and the transmission circuitry 302. In another example, the control logic may include hardware components or devices, or a combination of hardware and software elements, for performing these same operations.

In FIG. 3, the transmission scheduler 304, sometimes termed a "quality of service scheduler", includes multiple service flow queues 310A-310N into which the received data packets 303 are placed. More specifically, each of the received data packets 303 of a particular service flow are placed into the first-in, first-out (FIFO) service flow queue 310 reserved for that service flow. The transmission scheduler 304 then transfers each of the received data packets 303 residing in the queues 310 as data packets 306 to the transmission circuitry 302, wherein each transfer is timed or scheduled to conform to the expected or required quality of service assigned to the service flow.

The transmission circuitry 302 then receives the data packets 306 transferred from the transmission scheduler 304 and transmits them to the wireless communication device 320 over an air interface. In one embodiment, the transmission circuitry 302 embodies the physical layer of the air interface, wherein the generation and transmission of the actual communication signals carrying the data packets 308 occurs. In the case of WiMAX, the transmission circuitry 302 employs orthogonal frequency division multiplexing (OFMD) or orthogonal frequency division, multiple access (OFDMA) to transmit the data packets 308 as a plurality of "symbols", or collections of binary digits (bits). The symbols may be encoded in any of a number of modulation and coding schemes (MCSs). Further, these symbols may be transmitted to the wireless communication device 320 during one or more time slots of a downlink (DL) sub-frame of one or more time-division duplex (TDD) frames, with each frame having both a downlink sub-frame and an uplink (UL) sub-frame. Other communication methods involving a variety of transmission technologies may be employed to similar end in other embodiments.

Figure 4:
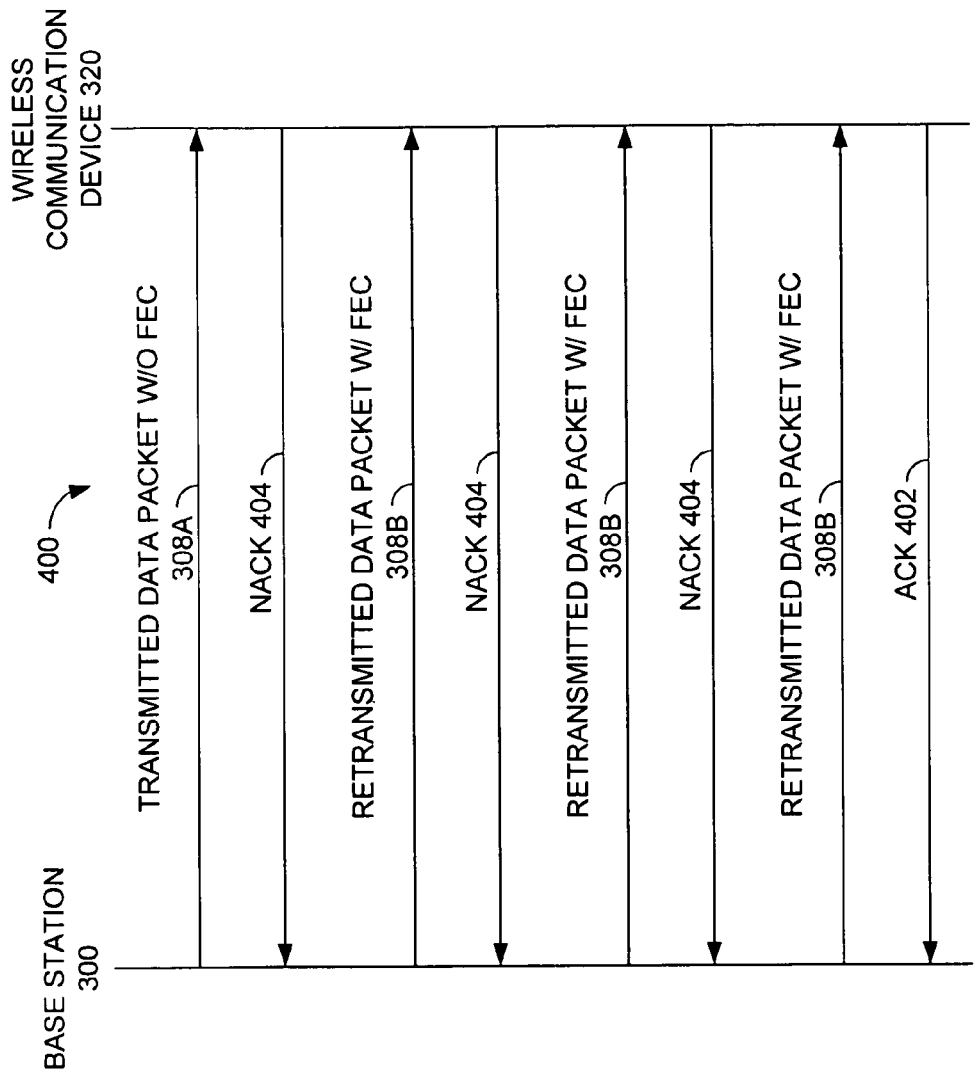
FIG. 4 is a communication diagram depicting a data packet transmission and associated retransmissions in the wireless communication system of FIG. 3.

In addition, the transmission circuitry 302 also employs a retransmission scheme, whereby data packets 308 received by the wireless communication device 320 that contain unrecoverable errors may be retransmitted to the device 320 one or more times. FIG. 4 provides a communication diagram 400 depicting the transfer of data packets 308 from the base station 300 to the wireless communication device 320, as well as status information regarding the data packets 308, as received by the communication device 320, in the form of "acknowledgments" (ACKs) and "non-acknowledgments" (NACKs). This particular exchange is representative of a hybrid automatic repeat request (HARQ) retransmission scheme or mechanism, as described above. In FIG. 4, a data packet 308A is initially transmitted to the wireless communication device 320 without any forward error correction (FEC) data. In one implementation, the transmitted data packet 308A includes error detection data that the receiving communication device 320 may process to determine if the data packet 308A includes any data errors. Further, the error detection data may allow the communication device 320 to identify one or more portions of the data packet 308A in which the detected errors are located.

Having determined that the transmitted packet 308A includes such errors, the communication device 320 returns a NACK 404 message to the base station 300 to indicate that fact. In one WiMAX embodiment, the communication device 320 transmits any ACKs 402 and NACKs 404 during an uplink sub-frame of a TDD frame, as described earlier.

Upon receiving the first NACK 404, the base station 300 retransmits the data packet 308B, this time including FEC information, such as error correction by way of a Reed-Solomon code, to allow the communication device 320 to attempt to correct one or more errors residing in the data packet 308B. Presuming data errors remain in the data packet 308B after the communication device 320 processes the FEC information, the communication device 320 may return a second NACK 404 to indicate that the data packet 308B still contains unrecoverable errors. In FIG. 4, the data packet 308B, including FEC information, is transferred again to the communication device 320, resulting in yet a third NACK 404 being returned because of unrecoverable errors remaining in the data packet 308B. However, upon the third retransmission of the FEC-encoded data packet 308B, the communication device 320 returns an ACK 402, indicating that the data packet 308B has finally achieved an error-free, or at least recoverable, state.

In one implementation, the communication device 320 may store at least the error-free or correctable portions of the previously received versions of the data packets 308A, 308B, thus allowing the device 320 to process and combine the various versions to yield a single error-free copy of the original data packet 308.

Providing a retransmission mechanism, such as the HARQ scheme described above, generally allows data packet error rates to be reduced drastically from the standpoint of the transmission scheduler 304. Conversely, multiple retransmissions of the data packets 308B, with their increased overhead due to the addition of the FEC data, may also increase the total delay and jitter associated with the data packet 308, thus reducing the actual quality of service of the service flow related to the data packet 308 with respect to delay and jitter.

In some HARQ schemes, instead of allowing an unlimited number of retransmissions of the FEC-enhanced data packets 308B, the base station 300 may impose a static limitation related to the desired quality of service for the corresponding service flow. For example, packets carrying data that must remain error-free but are not necessarily time-critical may be associated with a high number of allowable retransmissions, while packets having data that is more time-critical but in less need of being error-free may require fewer retransmissions. However, to further enhance the ability to maintain an expected quality of service, the base station 300 and other embodiments described herein may also take into account the ongoing transmission performance of the service flow associated with the data packet 308 being transmitted to dynamically alter the allowable number of retransmissions for a particular data packet 308.

In one implementation, the transmission scheduler 304 may measure and/or calculate transmission performance information of one or more data packets 308 of a particular service flow 310 relative to the expected quality of service for that flow 310, and then use that information to set a maximum number of retransmissions allowed for a packet 308 of the service flow 310 to be transmitted. More specifically, the scheduler 304 may track the amount of delay being experienced by the received data packets 303 of a particular service flow 310 before being transferred to the transmission circuitry 302 as packets 306, and use this information to determine the maximum number of allowable retransmissions for a data packet 308 of the service flow 310 to be transferred. For example, the total delay of a data packet 308 experienced in the base station 300 may include the delay of the packet 303 in the scheduler 304 plus the delay of the packet 306 in the transmission circuitry 302:

$$total\_delay = sched\_delay + transmit\_delay$$

If, for instance, data packets 303 in a particular service flow queue 310 are being delayed due to increased traffic from other service flows, or from increased numbers of retransmissions of preceding data packets 308 of the same or another service flow, the delay of the data packets 303 in the scheduler 304 may be relatively high. Thus, to maintain the amount of a total delay for the packet 308 within the limits of the expected quality of service for the corresponding service flow, the possible delay of the packet 306 within the transmission circuitry 302 may be restricted by reducing the maximum number of retransmissions of the packet 308 that are allowed. Thus, generally, the maximum number of retransmissions is selected on the basis of the performance of the transmission of other data packets 308 in the same service flow relative to the quality of service expected for the service flow.

While the implementation described above mainly employs the measured packet delay within the scheduler 304, other metrics, such as the jitter or packet loss of packets 303 associated with the same service flow, may also be employed to determine the maximum allowable number of retransmissions for a particular data packet 308 to be transmitted.

In a further embodiment, other aspects of the retransmission scheme employed by the transmission circuitry 302 may be altered dynamically. For example, the transmission circuitry 302 may dynamically alter the modulation and coding scheme (MCS) employed to transfer a particular data packet 308 for one or more retransmissions of the packet 308, depending on one or more performance metrics generated by the transmission scheduler 304 relative to the expected quality of service associated with the service flow of the packet 308.

Figure 5:
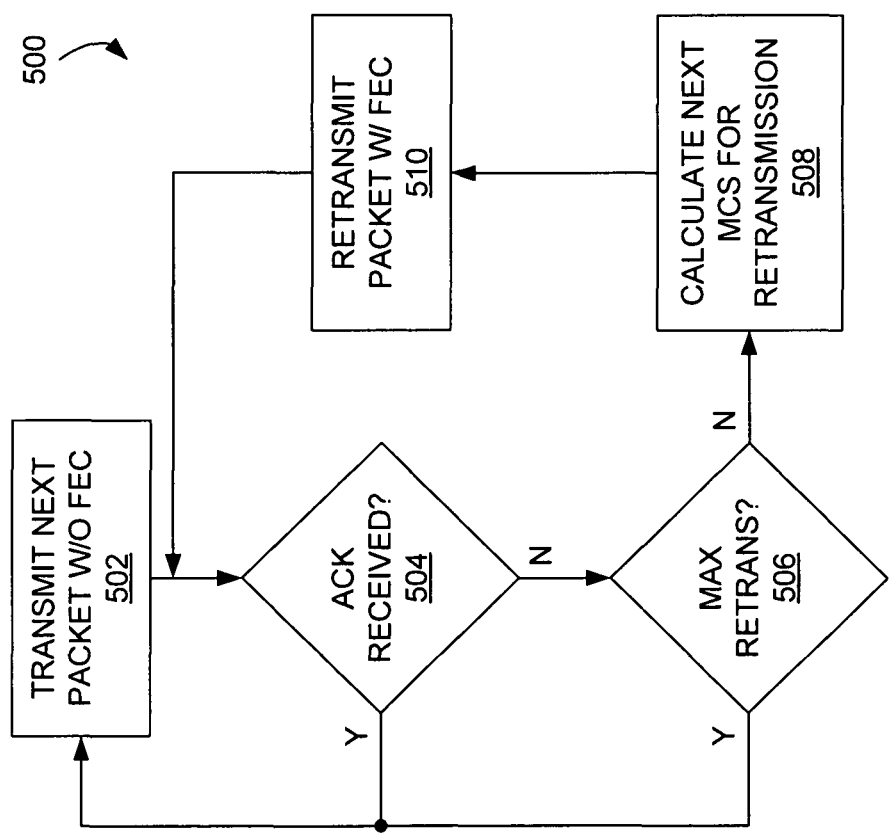
FIG. 5 is a flow diagram describing a retransmission scheme of the base station of FIG. 3 according to an embodiment of the invention.

FIG. 5 provides a flow diagram 500 of a modified HARQ retransmission scheme in which the base station 300 implements both a dynamic retransmission limit and a dynamic MCS mode selection for a data packet 308 being transmitted to the receiving communication device 320. As described earlier by way of FIG. 4, the transmission circuitry 302 initially transmits a data packet 308 received from the transmission scheduler 304 without forward error correction to the communication device 320 (operation 502). In one implementation, the transmission scheduler 304 also provides the maximum number of retransmissions allowed for the data packet 308A to the transmission circuitry 302. Further, in one implementation, the transmission circuitry 302 transmits the data packet 308 using a previously-determined modulation and coding scheme (MCS), as described above.

After the initial transmission 502, the transmission circuitry 302 awaits a response from the communication device 320 as to whether the data packet 308 was received correctly (operation 504). If so, (i.e., the transmission circuitry 302 received an ACK response 402), the transmission circuitry 302 proceeds to transfer another initial data packet 308A received from the transmission scheduler 304. Otherwise, if a positive response from the communication device 320 is not received, (i.e., a NACK response 404 was received, or possibly no response was received within a predetermined period of time), the transmission circuitry 304 determines whether the maximum number of allowed retransmissions for the data packet 308 have been attempted (operation 506). If so, the transmission circuitry 302 ceases further possible retransmissions of the current data packet 308, and proceeds to begin an initial transfer of the next data packet 308 received from the scheduler 304 (operation 502). Otherwise, the transmission circuitry 302 determines a new MCS mode for the next retransmission of the data packet 308 (operation 508), and retransmits the data packet 308 with FEC to the communication device 320 (operation 510). After the retransmission 510, the transmission circuitry 302 then awaits another response from the communication device 320 regarding the error status of the retransmission (operation 504). The transmission/retransmission process continues in this manner until the communication device 320 issues an ACK 402 to the base station 300, or until the maximum number of retransmissions of the data packet 308 has been attained.

The new MCS mode (operation 508) calculated for each retransmission of a data packet 308 may be based at least in part on performance information related to the quality of service associated with the packet 308. In one implementation, the transmission scheduler 304 generates a loss ratio comparing the packet loss rate experienced by the scheduler 304 for the associated service flow to the maximum packet loss rate allowable for the service flow under its expected quality of service. In one example, the packet loss rate at the scheduler 304 may be due to the packets 303 from the backhaul network not being received into the queue 310 for the correct service flow because of slowed transmissions, increased retransmissions due to errors, or the like involving the transmission circuitry 302.

The packet loss ratio may then be compared against a number of thresholds to define an integer "loss priority" value. In one implementation, the higher the loss ratio, the higher the loss priority. As is described in greater detail below, a high loss priority may result in a new MCS corresponding to a relatively low data transmission rate, thus enhancing the probability that the transmission accomplished via the new MCS mode will be in a correctable state when received at the communication device 320.

In one embodiment, other factors may be combined with the loss priority to further refine the generation of the new MCS mode for a data packet 308 retransmission. For example, the transmission circuitry 304 may utilize the current or previous MCS used to transmit or retransmit the same data packet 308 to further determine the new MCS. The current or previous MCS may then be implemented as a reference point from which to select the new MCS. In another implementation, the transmission circuitry 304 may utilize the maximum allowable number of retransmissions calculated by the scheduler 304, as noted above. In this particular context, a higher number of retransmissions allowed may result in the use of a higher data rate MCS mode, thus allowing the use of a lower-rate MCS for a later retransmission.

In a particular arrangement, the transmission circuitry 302 arithmetically combines each of these factors (i.e., the loss priority, the current or previous MCS mode, and the maximum allowable number of retransmissions) to develop the new MCS mode for the next retransmission of an FEC-supplemented data packet 308:

$$\text{new\_MCS} = \text{curr\_MCS} - (k1 * \text{loss\_priority}) + (k2 * \text{allow\_retrans}) - c$$

The above example equation for determining the new MCS mode includes a number of configuration or optimization parameters labeled k1, k2, and c. The use of these parameters may allow the base station 300 to further modify or enhance the use of the associated factors to produce an effective value for the new MCS mode.

In one implementation, the new MCS mode value may yield an integer that the transmission circuitry 302 as an index to a list of possible MCS modes. FIG. 6 provides a table 600 of such a list of MCS modes, presented from top to bottom in terms of increasing data rate. The MCS mode may represent any of a number of modulation schemes, such as quadrature phase shift keying (QPSK) and quadrature amplitude modulation (QAM). Each row of the table 600 presents a particular MCS mode 602 with a multiple-input, multiple-output (MIMO) antenna operating mode 604 (described further below), a related data rate 606 in terms of bits per symbol, and an MCS index 608. In this embodiment, the transmission circuitry 302 selects the new MCS mode 602 from the table using the MCS index 608 generated from the above equation. For example, presuming k1=k2=2, c=5, curr_MCS=13, loss_priority=2, and allow_retrans=4, an MCS index 608 (new_MCS) of 8 (i.e., 13−(2*2)+(1*4)−5) is generated. As a result, the transmission circuitry 302 switches from the 64 QAM ¾ (SM) mode 602 identified with the current MCS mode index 608 of 13 to a new MCS mode 602 of 64 QAM ⅔ (STC) associated with an index 608 of 8.

As mentioned above, in the particular example of FIG. 6, each of the MCS modes 602 is also associated with a specific MIMO antenna operating mode 604. More specifically, the use of multiple transmitting antennas at the base station 300, along with multiple receiving antennas at the communication device 320, allows variability in how the data packets 308 are transferred to enhance either data throughput or data reliability. In WiMAX, the use of two input antennas and two output antennas allows those antennas to be operated according to either a "space-time coding" (STC) mode, or MIMO-A mode, or a "spatial multiplexing" (SM) mode, otherwise termed MIMO-B. Typically, the SM mode facilitates twice the data throughput of that associated with the STC mode. However, the SM mode is typically more sensitive to challenging geographic and atmospheric conditions than is the STC mode due to the lack of signal diversity, typically resulting in a higher data error rate in the symbols received at the communication device 320. Thus, the MCS mode 602 employed for any particular transmission or retransmission may also be associated with a particular one of the MIMO modes 604 to further alter the data throughput and reliability based on the chosen MCS index 608. For example, in the specific example of FIG. 6, each of the four 64 QAM MCS modes 602 may be associated with either the STC (MIMO-A) mode (indexes 7-10), or the SM (MIMO-B) mode (indexes 11-14), thus altering the effective throughput rate of each 64 QAM MCS mode 602 by a factor of two.

In the above discussion, specific references are made to the transmission circuitry 302 and the scheduler 304 regarding the source of the information discussed and the various actions taken. However, other structures for a base station 300, such as one which does not specifically implement separate transmission circuitry 302 and scheduler 304 portions, may implement the operations as described above to yield comparable benefits.

While the discussion above focuses on data packet 308 transmissions from the base station 300 to the communication device 320, transmissions and associated retransmissions from the communication device 320 to the base station 300, such as during the uplink sub-frames of TDD frames in a WiMAX communication system, may be controlled according to the same process described above. For example, the communication device itself may incorporate the methods disclosed herein, either with or without the involvement of the base station 300 in determining the performance information, maximum allowable number of retransmissions, and the like.

Various embodiments as described above facilitate the dynamic control of a retransmission protocol or scheme based on performance information relative to an expected quality of service for the data transferred. As a result, aspects of the retransmission process, such as the maximum number of retransmissions allowed for a data packet, as well as the modulation and coding scheme employed for each separate retransmission, may be modified according to the constraints imposed by the expected quality of service. Thus, the retransmission behavior for each service flow is tailored to maximize the probability of each service flow adhering to the required quality of service metrics, such as total packet loss, total delay, and total jitter.

The above description and associated figures teach the best mode of the invention. The following claims specify the scope of the invention. Note that some aspects of the best mode may not fall within the scope of the invention as specified by the claims. Also, while many of the embodiments described above specifically involve use of the WiMAX communication environment, other wired and wireless communication system employing other transmission schemes may employ the concepts discussed herein to similar benefit. Those skilled in the art will also appreciate that the features described above can be combined in various ways to form multiple variations of the invention. As a result, the invention is not limited to the specific embodiments described above, but only by the following claims and their equivalents.

What is claimed is:

1. A method of communication retransmission, the method comprising:
   transmitting data packets associated with an expected quality of service;
   determining transmission performance associated with the transmission of the data packets relative to the expected quality of service, the transmission performance comprising a ratio of a rate of data packet loss of the transmitted data packets to a maximum allowable rate of data packet loss based on the expected quality of service;
   selecting a maximum number of retransmissions for one of the data packets to be transmitted based on the transmission performance; and
   transmitting the one of the data packets using a communication retransmission scheme based on the ratio and limited by the selected maximum number of retransmissions.

2. The method of claim 1, wherein determining the transmission performance further comprises:
   determining a maximum allowable delay for the data packets based on the expected quality of service;
   wherein selecting the maximum number of retransmissions for the one of the data packets to be transmitted is based on the maximum allowable delay.

3. The method of claim 1, wherein transmitting the one of the data packets using the communication retransmission scheme comprises:
   transmitting the one of the data packets in a transmission; and
   if an acknowledgment to the transmission is not received, retransmitting the one of the data packets in a retransmission until an acknowledgment is received, wherein the number of retransmissions is limited by the selected maximum number of retransmissions.

4. The method of claim 3, wherein:
   the transmission does not include forward error correction data for the one of the data packets; and
   each of the retransmissions comprises forward error correction data for the one of the data packets.

5. The method of claim 1, wherein transmitting the one of the data packets using the communication retransmission scheme comprises:
   transmitting the one of the data packets in a transmission using a first modulation and coding scheme; and
   if an acknowledgement to the transmission is not received, retransmitting the one of the data packets in a retransmission until an acknowledgment is received, wherein the number of retransmissions is limited by the selected maximum number of retransmission, and wherein each retransmission occurs using a new modulation and coding scheme based on the transmission performance.

6. The method of claim 5, wherein the new modulation and coding scheme is based on the selected maximum number of retransmissions.

7. The method of claim 5, wherein the new modulation and coding scheme is based on a previous modulation and coding scheme for transmitting or retransmitting the one of the data packets.

8. The method of claim 5, wherein the new modulation and coding scheme comprises a multiple-input, multiple-output antenna operating mode.

9. The method of claim 1, wherein the communication retransmission scheme comprises a hybrid automatic repeat request retransmission scheme.

10. A non-transitory computer-readable medium having encoded thereon instructions executable by a processor for employing a method of communication retransmission, the method comprising:
- transmitting data packets associated with a quality of service;
- determining transmission performance associated with the transmission of the data packets in relation to the quality of service, the transmission performance comprising a ratio of a rate of data packet loss of the transmitted data packets to a maximum allowable rate of data packet loss based on the expected quality of service;
- selecting a maximum number of retransmissions for one of the data packets to be transmitted based on the transmission performance; and
- transmitting the one of the data packets using a communication retransmission scheme based on the ratio and limited by the selected maximum number of retransmissions.

11. A communication station, comprising:
- transmission circuitry configured to transmit data packets associated with an expected quality of service to a communication device; and
- a transmission scheduler configured to transfer the data packets to the transmission circuitry according to the expected quality of service, to determine transmission performance of the transmission of the data packets relative to the expected quality of service, and to select a maximum number of retransmissions for one of the data packets to be transmitted based on the transmission performance;
- wherein the transmission performance comprises a ratio of a rate of data packet loss of the data packets being transmitted to a maximum allowable rate of data packet loss based on the expected quality of service, and
- wherein the transmission circuitry is configured to transmit the one of the data packets using a communication retransmission scheme based on the ration and limited by the selected maximum number of retransmissions.

12. The communication station of claim 11, wherein:
the transmission scheduler is further configured to determine the transmission performance by determining a maximum allowable delay for the data packets based on the expected quality of service, wherein the maximum number of retransmissions for the one of the data packets to be transmitted is based on the maximum allowable delay.

13. The communication station of claim 11 wherein:
the transmission circuitry is configured to transmit the one of the data packets using the communication retransmission scheme by transmitting the one of the data packets in a transmission, and if an acknowledgment to the transmission is not received, retransmitting the one of the data packets in a retransmission until an acknowledgment is received, wherein the number of retransmissions is limited by the selected maximum number of retransmissions.

14. The communication station of claim 13, wherein:
the transmission circuitry is configured to not include forward error correction data for the one of the data packets in the transmission; and
the transmission circuitry is configured to include forward error correction data for the one of the data packets in each of the retransmissions.

15. The communication station of claim 11, wherein:
the transmission circuitry is configured to transmit the one of the data packets using the communication retransmission scheme by transmitting the one of the data packets in a transmission using a first modulation and coding scheme, and if an acknowledgement to the transmission is not received, retransmitting the one of the data packets in a retransmission until an acknowledgment is received, wherein the number of retransmissions is limited by the selected maximum number of retransmission, and wherein each of the retransmissions occurs using a new modulation and coding scheme; and
wherein the transmission circuitry is configured to select the new modulation and coding scheme for each of the retransmissions based on the transmission performance.

16. The communication station of claim 15, wherein:
the transmission circuitry is configured to select the new modulation and coding scheme based on the selected maximum number of retransmissions.

17. The communication station of claim 15, wherein:
the transmission circuitry is configured to select the new modulation and coding scheme based on a previous modulation and coding scheme for transmitting or retransmitting the one of the data packets.

18. The communication station of claim 15, wherein the new modulation and coding scheme comprises a multiple-input, multiple-output antenna operating mode.

* * * * *